(12) United States Patent
Gagne (10) Patent No.: US 11,179,815 B2
(45) Date of Patent: Nov. 23, 2021

(54) APPARATUS FOR RECONDITIONING A HEAVY WORKPIECE

(71) Applicant: 9349-3039 QUÉBEC INC., Verchères (CA)

(72) Inventor: Jonathan Gagne, Verchères (CA)

(*) Notice: Subject to any disclaimer, the term of this patent is extended or adjusted under 35 U.S.C. 154(b) by 200 days.

(21) Appl. No.: 16/472,296

(22) PCT Filed: Nov. 15, 2017

(86) PCT No.: PCT/CA2017/051360
§ 371 (c)(1),
(2) Date: Jun. 21, 2019

(87) PCT Pub. No.: WO2018/112602
PCT Pub. Date: Jun. 28, 2018

(65) Prior Publication Data
US 2020/0001409 A1    Jan. 2, 2020

(30) Foreign Application Priority Data
Dec. 23, 2016   (FR) ....................... 1663355

(51) Int. Cl.
*B23B 3/26*      (2006.01)
*B23P 6/00*      (2006.01)
(Continued)

(52) U.S. Cl.
CPC ................ *B23P 6/00* (2013.01); *B23B 3/26* (2013.01); *B23C 3/18* (2013.01); *B23Q 17/2233* (2013.01); *B23Q 2210/006* (2013.01)

(58) Field of Classification Search
CPC ... B23P 6/00; B23P 23/04; B23B 3/26; B23C 3/18; B23Q 17/2233; B23Q 2210/006;
(Continued)

(56) References Cited

U.S. PATENT DOCUMENTS

| 2,122,662 A | 7/1938 | Shaw |
| 3,608,172 A | 9/1971 | Linquist |

(Continued)

FOREIGN PATENT DOCUMENTS

| CA | 2719190 A1 | 9/2011 |
| CN | 1660538 A | 8/2005 |

(Continued)

OTHER PUBLICATIONS

FR 1663355 search report and written opinion dated Aug. 21, 2017.
(Continued)

*Primary Examiner* — Rick K Chang
(74) *Attorney, Agent, or Firm* — Anglehart et al.

(57) ABSTRACT

A method for the in-situ reconditioning of a heavy workpiece mounted on the floor. The method comprises assembling a jig mounted on the floor so as to be arranged around the workpiece to be reconditioned, that is also mounted on the floor, the jig supporting a gantry at the two ends of same, on which there is mounted a precision robotic arm carrying at least one machining apparatus. The method also comprises the alignment of the workpiece and the jig using a precision laser alignment tool in order to allow the jig, the gantry and the robotic arm to form a precision machining apparatus. The method also comprises the reconditioning of the workpiece using the precision machining apparatus.

8 Claims, 8 Drawing Sheets

(51) Int. Cl.
*B23C 3/18* (2006.01)
*B23Q 17/22* (2006.01)

(58) Field of Classification Search
CPC ...... B23Q 17/2428; B23Q 9/02; B23Q 1/012; Y02P 70/10; Y02P 70/50; Y02E 10/20; Y02E 10/72; F03B 11/00
See application file for complete search history.

(56) References Cited

U.S. PATENT DOCUMENTS

| | | | |
|---|---|---|---|
| 3,762,273 | A | 10/1973 | Sprung |
| 4,177,610 | A | 12/1979 | Farkas et al. |
| 4,197,629 | A | 4/1980 | Reese et al. |
| 4,959,523 | A | 9/1990 | Fihey et al. |
| 5,167,720 | A * | 12/1992 | Diamond ............ B05B 13/0442 134/144 |
| 5,235,745 | A | 8/1993 | Fraser |
| 5,709,303 | A * | 1/1998 | Best ............ B23P 21/004 206/459.1 |
| 6,769,365 | B1 | 8/2004 | Ward |
| 6,871,412 | B2 | 3/2005 | Markeson |
| 7,395,606 | B2 * | 7/2008 | Crampton ............ G01B 11/03 33/503 |
| 7,547,516 | B2 * | 6/2009 | Light, II ............ G01N 35/0099 435/6.11 |
| 7,787,681 | B2 * | 8/2010 | Zhang ............ C40B 30/10 382/128 |
| 8,899,889 | B2 | 12/2014 | Yoshida |
| 9,212,344 | B2 * | 12/2015 | Tsumura ............ C12M 23/50 |
| 9,463,519 | B2 | 10/2016 | Zeller |
| 9,481,518 | B2 * | 11/2016 | Neiser ............ B65G 1/1373 |
| 9,512,531 | B2 * | 12/2016 | Vijay ............ C23C 24/04 |
| 9,579,679 | B2 * | 2/2017 | Mathis ............ B64F 5/30 |
| 9,732,374 | B2 * | 8/2017 | Buse ............ B01L 3/50825 |
| 10,099,466 | B2 * | 10/2018 | Skogsrud ............ B33Y 10/00 |
| 2007/0269608 | A1 | 11/2007 | Saito et al. |
| 2011/0011222 | A1 | 1/2011 | Bales |
| 2015/0014909 | A1 | 1/2015 | Andrews, Jr. et al. |

FOREIGN PATENT DOCUMENTS

| | | |
|---|---|---|
| CN | 201089021 Y | 7/2008 |
| CN | 102335821 A | 2/2012 |
| CN | 102335821 A | 2/2012 |
| CN | 204603567 U | 9/2015 |
| CN | 204603567 U | 9/2015 |
| CN | 205363248 U | 7/2016 |
| CN | 205363248 U | 7/2016 |
| DE | 102007061542 A1 | 6/2009 |
| DE | 102007061542 A1 | 6/2009 |
| DE | 102009059659 A1 | 6/2011 |
| EP | 0369891 A2 | 5/1990 |
| FR | 2906744 A1 | 4/2008 |
| FR | 2906744 A1 | 4/2008 |
| FR | 2906745 A1 | 4/2008 |
| WO | 2003/092952 A2 | 11/2003 |

OTHER PUBLICATIONS

PCT/CA2017/051360 English Translation of the Written Opinion of the International Searching Authority dated Mar. 8, 2018.
PCT/CA2017/051360 International Preliminary Report on Patentability Chapter I dated Jun. 25, 2019.
PCT/CA2017/051360 International Search Report dated Mar. 8, 2018.
PCT/CA2017/051360 Search Strategy dated Mar. 8, 2018.
PCT/CA2017/051360 Translation of the ISR dated Mar. 8, 2018.
PCT/CA2017/051360 Written Opinion of the International Searching Authority dated Mar. 8, 2018.
European application No. 17885366.9 search report and examination opinion dated Sep. 22, 2020.
Canadian application No. 3,047,712 Office Action dated Dec. 3, 2020.
Canadian application No. 3,047,712 Office Action dated Aug. 25, 2020.

* cited by examiner

APPARATUS FOR RECONDITIONING A HEAVY WORKPIECE

This application claims the priority of the French patent application No. 1,663,355 with a filing date of Dec. 23, 2016.

FIELD

The invention relates to the field of reconditioning heavy parts, especially those found in hydroelectric plants and wind turbines, such as parts making up hydroelectric turbines.

CONTEXT

Hydroelectric turbines and wind turbines are composed of bulky parts with a significant weight. Many of these parts may weigh hundreds of tons and span several meters. For example, the Francis turbine, a hydraulic turbine, suitable for medium drop heights and medium and strong powers and flows, may weigh around 450 tons and have a diameter of approximately ten meters. Moreover, the Kaplan turbine is a propeller-type hydraulic turbine, suitable for small falls, with some having an 11 meters diameter.

The size and weight of these parts make overhauling and maintenance difficult. Heavy parts that need reconditioning in hydropower plants are, for example, a Francis or Kaplan type wheel, a wicket gate, a draft tube, an alternator, runner blades, a shaft or a gate opening ring.

In the case of hydroelectric turbines, given their size and weight, it is difficult, given the state of the art, to carry out in-situ repairs, thus in the hydroelectric plant. Moreover, it is common to have to move the part of the hydraulic turbine to an outside site, having the necessary infrastructure to perform the reconditioning. However, the transfer of the part of the hydraulic turbine is long, expensive and greatly inconvenient for the following reasons.

First, hydroelectric plants, in view of the space occupied by them, are often located far from industrialized areas where the sites to perform the reconditioning exist. Thus, it is necessary to transport the turbine part for long periods to get to the site. This transfer is tedious considering the size of the part to recondition. In particular, the parts must be transported for long distances while avoiding, for example, overpasses. This transfer may cause a temporary blockage of the roads on which the part is being transported. Transport is also very expensive in terms of fuel and often requires specialized equipment or specific transport vehicles to secure the heavy part during transport. In addition, the transport of the part by the road may require obtaining specific permits. There are also risks of accidents related to transportation. On the other hand, in countries where there is freezing risks, it is possible to have to wait for thaw periods before transporting the heavy part, resulting in additional delays.

Secondly, during the period of the transport of the heavy part to the reconditioning site, including the time taken for its reconditioning, as well as the time required to return the heavy part and reinstall it, the turbine in question is not functional. Thus, there is a loss of electricity production related to the period of transfer and reconditioning of the part. Given the time taken for the transfer, these losses are often very important and are preferably avoided.

Thus, the costs and delays associated with the reconditioning of a heavy part, such as a wind turbine or hydraulic turbine, are very important. The development of a system that avoids, at least in part, these costs and delays would be preferable.

SUMMARY

The applicant has developed a precision reconditioning apparatus, portable and storable, that may be used in a hydroelectric power plant, or near the power generation system, to perform reconditioning of the heavy parts. This device allows the reconditioning of heavy parts while avoiding costs and lost time associated with transporting the workpiece to an external site.

The reconditioning device may be assembled from several segments so that it is easy to transport and store. A step of aligning the device is performed during and after installation to properly adjust the dimensions and positioning of the device, before the positioning of the heavy workpiece relative to it, and after the positioning of the heavy workpiece. The alignment is performed with a laser alignment tool to obtain the required accuracy during this step. It is also important that the alignment step takes into account the positioning of the heavy workpiece with regards to the components of the reconditioning device, such as the jig.

Once the alignment is completed, it is possible to carry out the repairs of the heavy workpiece with precision, the dimensions of the heavy workpiece and the reconditioning device being known and verified by the alignment step. The heavy workpiece may then be reinstalled. The reconditioning apparatus may also be dismantled and stored, so that it minimizes the space taken when not in use. The device may be taken out and reused when it is next used.

A first aspect is an in-situ reconditioning process of a heavy workpiece mounted on the floor. The method is characterized in that there is the assembly of a jig mounted on the floor, to be placed in proximity of the part to be reconditioned, also mounted on the floor, the jig carrying a mount on which is mounted the precision robotic arm carrying at least one machining unit. The method also includes the alignment of the workpiece and the jig with the aid of a precision laser alignment tool in order to allow the jig, the frame and the robotic arm to create a precision machining apparatus. The process also comprise machining the workpiece using the precision machining device.

According to an example of the method, the assembly of the jig is carried out so that the jig is arranged around the workpiece to be reconditioned, the frame includes a gantry, and the jig supporting the gantry at both ends.

According to an example of the method, it may be characterized in that the jig is configured so that a portion of the jig moves relative to the floor, the reconditioning may include the displacement of this portion of the jig relative to the floor.

According to one example of the method, the method may also include the displacement of the portion of the jig being performed using a roller gear system mounted on precision bearing which operates through a rack-and-pinion attached to the jig.

According to an example of the method, the jig may also have a central stilt and an annular turntable centered around the central stilt, the assembly step may have the positioning of the workpiece to be reconditioned around the central stilt and the gantry supported by one of its two ends on the central stilt and the other of its said two ends on the turntable.

According to an example of the method, the annular turntable may have sections forming superimposed rings, the assembly may include the arrangement and assembly of the sections forming the two superimposed rings around the workpiece to be reconditioned. The assembly may also include the positioning of the turntable and the workpiece to be reconditioned so that the turntable and the workpiece to be reconditioned are concentric.

According to an example of the method, the method may also include, prior to assembly, the positioning of stilts on the floor using a precision laser alignment tool and the adjustment of the stilt's height using a precision laser alignment tool, the stilts being positioned to receive the workpiece to be reconditioned and the jig.

According to an example of the method, the assembly may also provide for bolting the stilts to the floor.

According to one example of the method, the method may also include the adjustment of the stilts using a precision laser alignment tool once the stilts received the workpiece to recondition and the jig in order to compensate for the floor variations on which is placed the stilts which received the workpiece to be reconditioned and the jig.

According to an example of the method, the assembly may also include the use of wedges between the stilts and the jig and between the stilts and the workpiece to be reconditioned in order to minimize the wear of the stilts during the reconditioning.

According to another example of the method, the robotic precision arm carries a welding tool adapted to add metal to the heavy workpiece, and the reconditioning may provide for the welding of the heavy workpiece to be reconditioned.

A second aspect is a renewable electricity generation process, through an electricity generation system, consisting of heavy parts used in the power generation system. The electricity generation process includes the production of electricity, and the determination if a part of the power generation system needs reconditioning. The process also includes the reconditioning, according to the in-situ reconditioning process described herein, and the resumption of power generation.

The power generating process may be a hydroelectric generating system, the electricity generating system may be a hydroelectric generating station, and the power generating system component may be a part of a hydro turbine. The process may also be a kinetic energy conversion process of the wind into electrical energy (wind energy), the power generation system being a wind turbine, and the component of the electricity generation system a component of the wind turbine. The part may be either a Francis type moving wheel, a Kaplan type moving wheel, a wicket gate, a draft tube, an alternator, a runner blade, a shaft, a crown, an upper floor, a lower floor or a c gate opening ring. The part may also be one or more blades, a wind turbine orientation system, the gearbox, the nacelle or the rotor control hub shaft.

A third aspect is a precision reconditioning apparatus for a heavy workpiece mounted on the floor. The apparatus includes a jig comprising a central stilt and an annular turntable centered around the central stilt. The apparatus includes a gantry with two ends configured to be supported at one of its two ends on the central stilt and the other of its two ends on the turntable. The device includes a robotic arm mountable on the gantry, the robotic arm configured to receive a machining apparatus for realigning the heavy workpiece.

According to an example of the apparatus, the robotic arm may include at least one machining apparatus.

According to an example of the apparatus, the at least one machining apparatus may include a welding tool adapted to add metal to the workpiece.

According to an example of the apparatus, the turntable may include a fixed part and a moving part, the fixed part being connected to the moving part by a precision bearing system.

In one example of the apparatus, the precision bearing system may be a precision roller system of bearing-supported roller pinions which engages with a rack attached to the jig.

According to one example of the apparatus, the apparatus may include at least three height adjustable stilts for receiving the turntable to allow the leveling of said turntable.

According to an example of the apparatus, each of the height adjustable stilts for receiving the turntable may include a wedge configured to be placed between the turntable and each of the stilts to receive the turntable.

According to an example of the apparatus, the apparatus may include at least three height adjustable stilts to receive the heavy workpiece and to allow the leveling of the heavy workpiece.

According to an example of the apparatus, each of the height adjustable stilts for receiving the heavy workpiece may include a wedge configured to be placed between the heavy workpiece and each of the stilts to receive the heavy workpiece.

According to an example of the apparatus, the turntable may be composed of a segments assembly in the form of an arc.

A fourth aspect is a robotic jig for machining or precision reconditioning of a heavy workpiece mounted to the floor. The jig includes a ring-shaped turntable consisting of an assembly of arc shaped segments to constitute a fixed part and a movable part, the fixed part being connected to the movable part by a precision bearing system, the turntable being able to surround the heavy workpiece mounted on the floor. The jig includes at least three height adjustable stilts to allow for the leveling of said turntable. The jig includes a precision displacement system including the precision bearing system for moving the movable portion relative to the fixed part of the turntable.

According to an example of the jig, the jig may include a mount for a robotic tool on the moving part allowing the tool an all-around access to the heavy workpiece mounted to the floor.

According to an example of the jig, the frame may include a gantry having two ends, the gantry supported at a first of its two ends on the turntable.

According to an example of the jig, the jig may include a central stilt.

According to an example of the jig, the gantry may be supported at a second of its two ends on the central stilt.

According to an example of the jig, the precision bearing system may be a precision system of bearing-supported roller pinions which engages with a rack attached to the jig.

According to an example of the jig, each of the stilts may include a wedge configured to be placed between the turntable and each of the stilts.

DESCRIPTION OF FIGURES

The invention will be better understood with the aid of the description which follows, with reference to the following appended figures.

DETAILED DESCRIPTION

In order to avoid the losses associated with transporting the heavy workpiece to an external site for reconditioning, it is advantageous to develop an in-situ reconditioning machine, to be used near the hydroelectric plant, with a degree of accuracy that is at least comparable to that found at these external reconditioning sites. However, given the size (ex: more than ten meters in diameter) and weight (ex: hundreds of tons) of the workpiece to be reconditioned, such device must be able to support such a heavy part, while offering a way to recondition this workpiece to a degree of precision sufficient to avoid that the part loses its functionality when it is reinstalled following its reconditioning.

However, in order to carry out the in-situ reconditioning of a heavy workpiece, such as those constituting a hydraulic or wind turbine, the reconditioning device is preferably portable and may be stored when not in use, given the necessary size of the apparatus to accommodate such heavy workpieces.

Figure 1A:
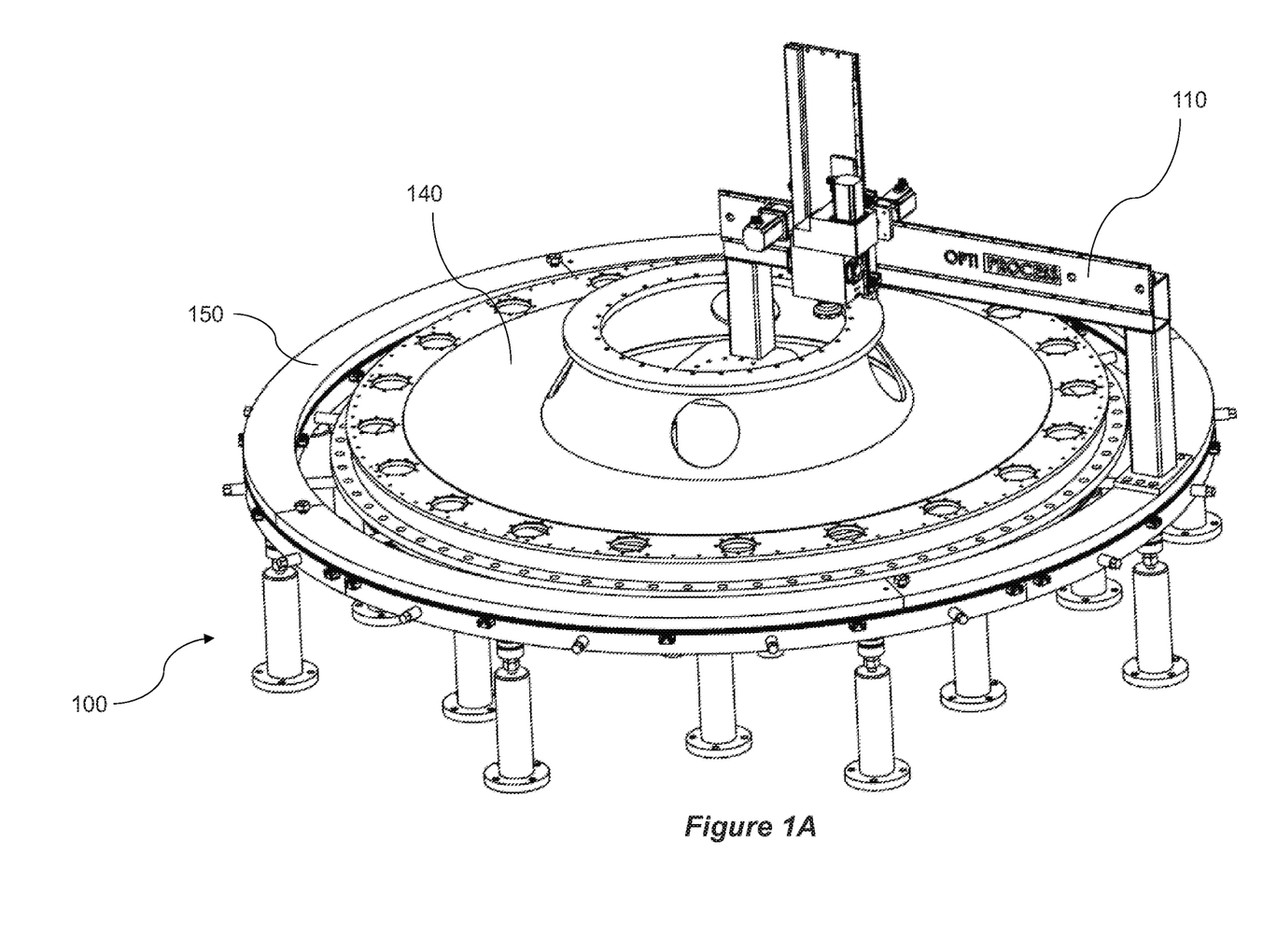
FIG. 1A is an isometric view from above illustrating an exemplary precision reconditioning apparatus with an exemplary heavy workpiece.
Figure 1B:
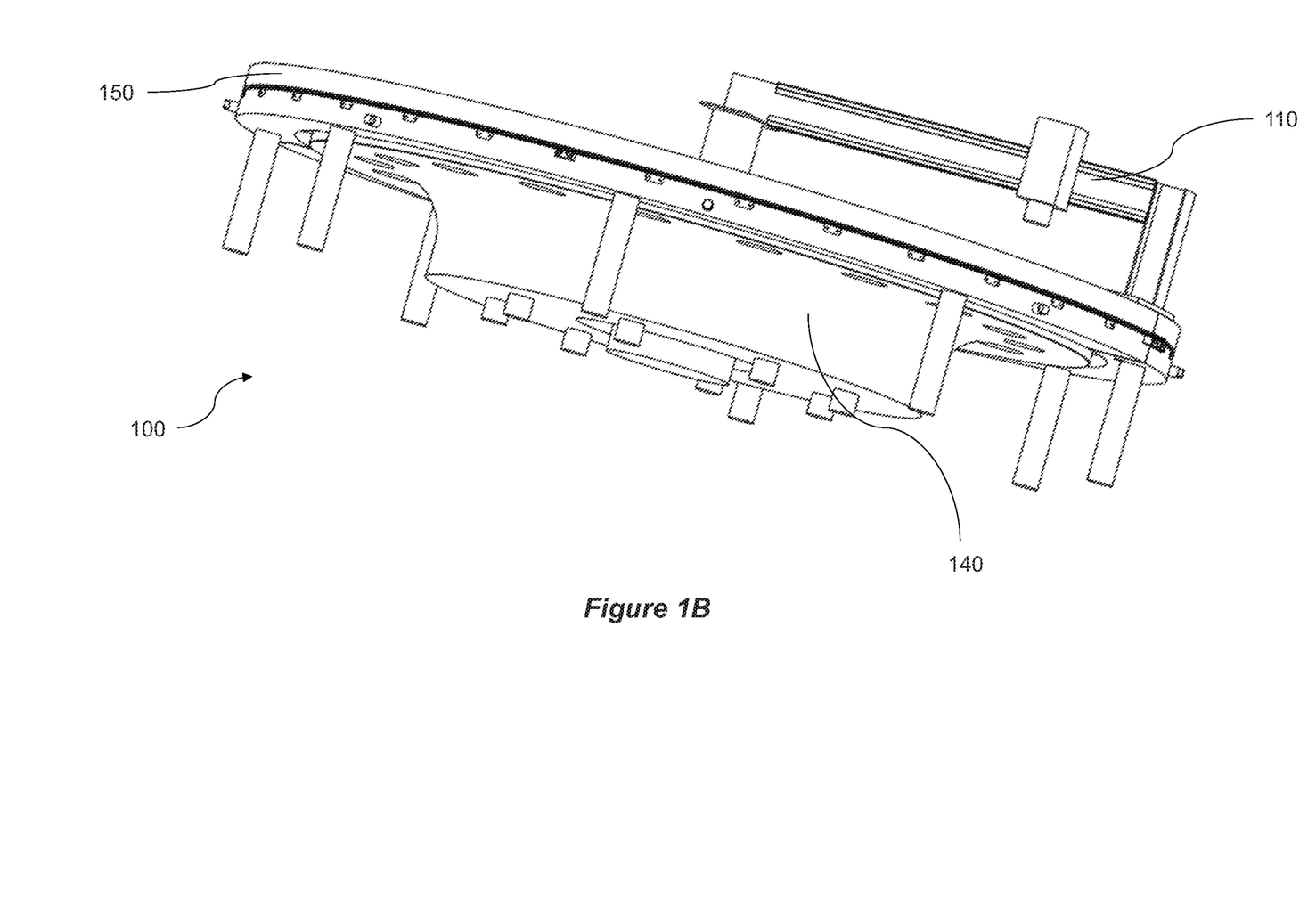
FIG. 1B is an isometric view from below illustrating an exemplary precision reconditioning apparatus with an exemplary heavy workpiece.

FIGS. 1A and 1B illustrate an exemplary precision reconditioning apparatus 100 and a heavy workpiece 140 to be reconditioned. This apparatus 100 has a jig 150, and a gantry 110 on which is mounted an exemplary precision robotic arm 115 carrying an exemplary reconditioning apparatus 116. The jig 150 and the heavy workpiece 100 may be supported on stilts 154, such as those illustrated in FIG. 2.

Figure 6:
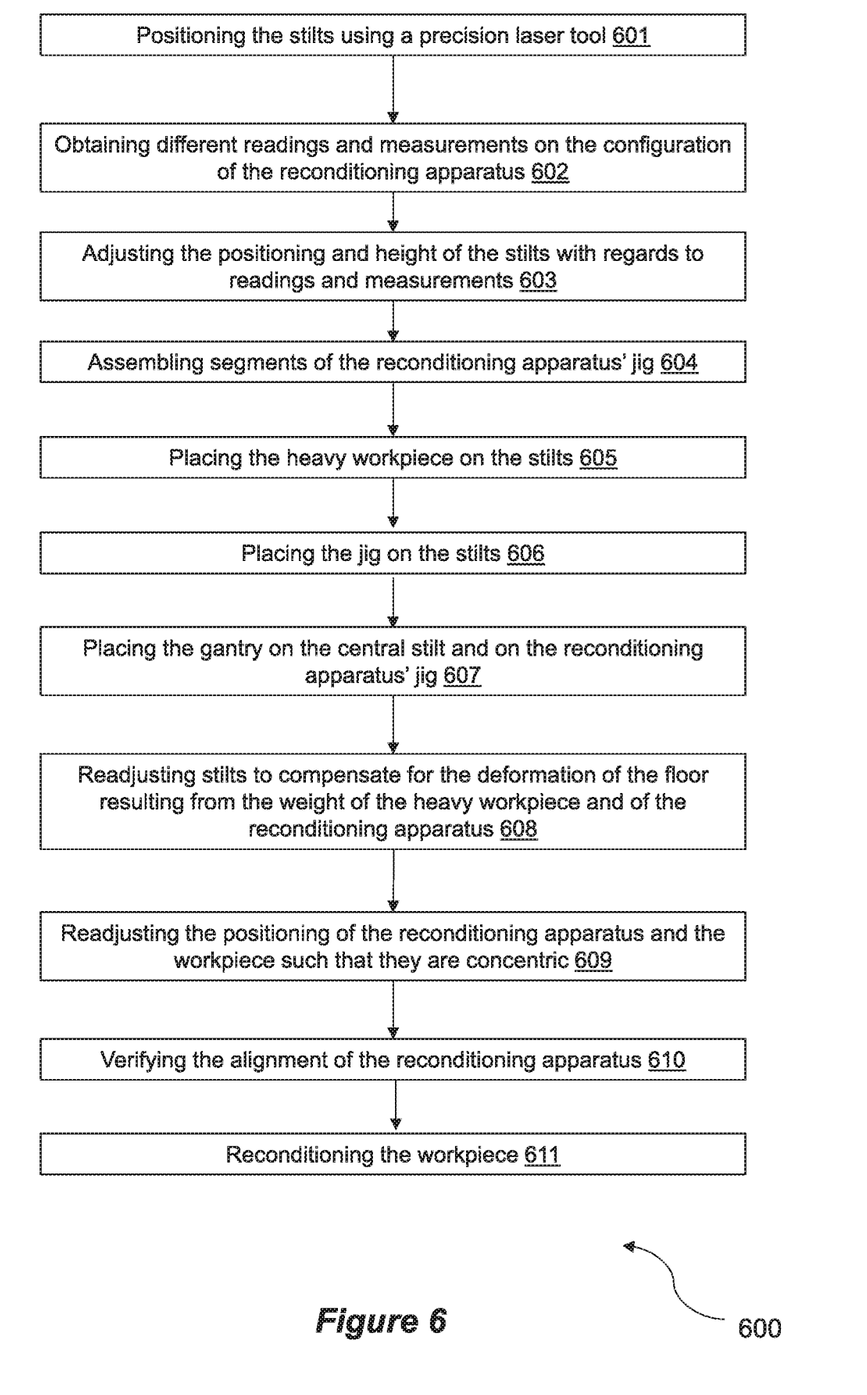
FIG. 6 is a flow chart of an exemplary method of reconditioning a heavy workpiece using a reconditioning apparatus.

In order to obtain the degree of precision necessary during the reconditioning, the aligning of the reconditioning apparatus 100, including its jig 150, is necessary. This will be demonstrated in FIG. 6, illustrating an exemplary process for reconditioning a heavy workpiece using a precision reconditioning apparatus, such as the precision reconditioning apparatus 100. The reconditioning process is performed on a hard surface, such as a floor, as this surface must support the weight of the reconditioning device and of the heavy workpiece and not cause, for example, excessive soil compaction. Furthermore, any deformation of the ground or the floor must be taken into account during the aligning to obtain the necessary precision during reconditioning.

The first step 601 is characterized by the positioning of the stilts on the floor. In some examples, some stilts will receive the jig and other stilts will receive the heavy workpiece. Thus, the stilts must be distributed on the floor in a specific configuration to receive the jig and the heavy workpiece, but also be placed relative to each other in order to properly distribute the weight of the heavy workpiece and the jig. Thus, the location of the stilts is important for these ends.

The positioning of the stilts may be performed using a precision alignment tool, for example, a tracking laser with a probe, as known in the art. In the example of the tracking laser with a probe, the probe is used to measure distances between itself and the laser, the user adjusting the position of the stilts or the alignment as a function of the readings obtained from the tracking laser. With the laser alignment tool, it is possible to precisely position the stilts at fixed distances from each other. In some examples, there are eight stilts to receive the heavy workpiece and eight stilts to receive the jig. It is appreciated that the number of stilts respectively receiving the heavy workpiece and the jig may vary depending, for example, on the weight, dimensions or size of the workpiece.

There may also be the positioning of sub-stilts, being in some examples smaller than the other stilts, to provide additional support for the heavy workpiece. In some examples, the sub-stilts may be placed around a central stilt, the location of the sub-stilts may be calculated using the same alignment techniques described herein.

The location of the stilts may be done using software, calculating the location of each stilt. The laser alignment tool may identify the locations on the floor where each stilt should be placed.

According to the readings obtained from a measurement tool in step 602, the height of the stilts is also adjusted in order to receive the jig and the workpiece to be reconditioned. In some cases, each peg may have an adjustable screw for adjusting the height of each peg. In some cases, the measurement tool may be the laser alignment tool, where the laser sensor may be placed on the top of each stilt in order to calculate its height. It is thus possible to make a first height adjustment and, if necessary, also of the position, of each stilt as a function of the readings received from the tracking laser at step 603. In some examples, the height of each stilt may be calculated with a tape measure, where an alignment step at higher accuracy will be carried out at a later stage, thus when the jig and the heavy component are placed on the stilts.

It is also possible, in some examples, to install a central stilt that will receive, for example, one side of the gantry. The central stilt may be installed and adjusted using the same alignment steps as those used to install the other stilts.

In some examples, the stilts are also bolted to the floor to minimize any movement thereof during the steps of installation of the reconditioning device and the reconditioning itself. It is appreciated that any other technique for anchoring the stilts to the floor may be used.

Once the stilts are properly placed and adjusted, the jig is assembled at step 604. The jig may be a turntable (as illustrated, for example, in FIG. 1A) of annular form composed of several segments. In some examples, the annular shape of the jig is adapted to enclose the heavy workpiece to be reconditioned (eg. when the heavy workpiece has a disk shape, such as a Kaplan wheel or a Francis wheel). However, the shape of the jig may also vary depending on the shape and characteristics of the heavy workpiece to be reconditioned.

In the case where the jig is composed of a plurality of segments forming an annular turntable, the segments may be joined together to form the ring before being placed on the stilts. In some examples, the turntable is constituted by quarters forming the ring. However, the number of segments may vary. The jig may also be formed by two superimposed segmented rings, the two segmented rings forming the turntable. In these examples, the segments of the first ring may be installed first, and then, secondly, the segments forming the second ring are installed atop. In other examples, the two rings may be assembled together, and subsequently placed together on the stilts.

The heavy workpiece is subsequently placed on the stilts which are placed to receive the heavy workpiece at step 605. Considering the size and the weight of the heavy workpiece, it may also be transported and placed on the stilts using a gantry crane.

Then, the jig is positioned on the stilts that are placed to receive this in step 606. The jig may be installed on the stilts with a gantry crane. The jig may be placed around the heavy workpiece.

In some examples, it is also possible to place wedges between the heads of the stilts and the jig, and the heads of the stilts and the heavy workpiece in order to minimize wear, such as wear of the heavy workpiece caused during its centering.

Subsequently, the gantry is placed and installed on the reconditioning apparatus at step 607. The gantry may also be transported by a gantry crane. In some examples, the gantry is joined to the central stilt on one side, and on the other side to the turntable, and, for example, bolted at both ends (eg. the upper surface of the ring of the top of the turntable when this consists of two rings). It is appreciated that other means for anchoring the ends of the gantry to the central stilt and/or to the turntable may be used. Furthermore, in other examples, the dimensions of the gantry may change and the gantry may be anchored in different places, such as a gantry that is the diameter of the jig (ex: when the jig is annular), the two ends of the gantry anchored to the jig at two diametrically opposed locations on it.

The gantry is also configured to accommodate the robotic arm attached to the reconditioning tool. The configuration between the reconditioning tool and the robotic arm, placed on the gantry, may allow the reconditioning tool to have access to all of at least one surface of the heavy workpiece in order to carry out the necessary overhaul. The reconditioning tool may be, for example, a machining tool, adapted to remove material from the heavy workpiece. The reconditioning tool may also be a welding tool for adding metal to the heavy workpiece. It is appreciated that the reconditioning tool may be any other device, such as a stripping tool, to perform the reconditioning of the heavy workpiece.

Once the gantry, the jig and the heavy workpiece are installed, it is preferable to make a second alignment at step 608. This alignment step is often necessary because the weight of the heavy workpiece (and the jig) on the floor frequently causes deformation of the floor. This deformation of the floor also causes a change in the position of the jig and gantry with respect to the heavy workpiece. Thus, it is necessary to perform the leveling and the jig alignment to readjust the position of the reconditioning apparatus to compensate for the deformation of the floor. Alignment and leveling may be done using the laser alignment tool. In the case of the tracking laser and its probe, the probe may be used in taking measurements by being placed at different places on the jig, and the stilts may be readjusted according to the measurements taken, according to the necessary calculations to perform, by for example, a leveling of the jig. Other measures may be taken with the laser alignment tool to ensure that the adjustments made are sufficient to level the reconditioning device (including the jig). This second alignment and leveling exercise is necessary to obtain the desired level of precision during reconditioning. The angles and positions of the apparatus and the jig must be known in order to be able to effectively control the reconditioning tool digitally, allowing precise reconditioning.

Further, in examples where the heavy workpiece has a disc shape and the turntable has an annular shape, the position of the heavy workpiece and the position of the turntable surrounding the ring are adjusted so that they are concentric in step 609. This positioning may also be performed using the laser alignment tool. The tracking laser probe is placed at different locations on the heavy workpiece and at different locations on the jig. Depending on the measurements received from the probe and the tracking laser, it is possible to calculate the center of the heavy workpiece and the jig, and what displacements are necessary so that the two centers come together, using calculations as known in the art. The necessary adjustments may also be made by changing the height or location of the stilts. Concentricity is preferable to facilitate digitally performed reconditioning.

Subsequently, there may be an additional step of alignment to verify whether the jig, the gantry and the reconditioning tool are aligned, performing these verifications along the x, y and/or z axes at step 610. This verification may also be performed using the laser alignment tool. For example, it is possible to check the displacement of the reconditioning tool along the three axes and correct any unwanted displacement difference by using, for example, wedges, or by adjusting the height stilts. For example, it is possible to check the position and dimensions of the gantry with regards to the heavy workpiece and the jig, and make any adjustment or correction of any error along the axes using wedges.

Once the alignment is completed, it is now possible to recondition the machine in step 611. The reconditioning may be aimed at repairing certain workpieces or make certain shape transformations to the heavy workpiece in order to optimize its functionality. The reconditioning may be, for example, a cutting or machining of the heavy workpiece, or welding thereof. Thus, the robotic arm may support, for example, a machining and welding tool. The reconditioning process may be undertaken entirely numerically, as the alignment has made it possible to obtain precise dimensions of the jig, the heavy workpiece and the placement of the heavy workpiece with respect to the jig and the gantry. Moreover, the gantry, fixed to the robotic arm, may allow the reconditioning tool to access the entirety of a surface from the heavy workpiece, in order to recondition the surface anywhere without manual intervention.

Finally, once the heavy workpiece is reconditioned, it may be reinstalled. For example, in the case of a hydroelectric power plant, the heavy workpiece may be reinstalled, to allow the hydro turbine to start generating electricity again. However, as the time lost in transporting the heavy workpiece to the external site is avoided, the total period of non-operation of the turbine during its reconditioning is reduced, thus also reducing the production losses associated therewith. Moreover, the result of the reconditioning of the heavy workpiece may be comparable to the result if this part would have been reconditioned at an external site.

Following the reconditioning of the workpiece, the reconditioning device may be dismantled and stored until the next time a reconditioning of a heavy workpiece would be necessary.

Electricity Production:

The method of reconditioning a heavy workpiece may be used in the context of the production of electricity, such as the electricity produced by a hydroelectric plant or wind turbines.

For example, the power generation system may produce electricity until it is determined that the reconditioning of one of the heavy parts is necessary. For example, reconditioning may be necessary to repair a broken part, overhauling it for better performance, or optimizing the shape of the part to increase its efficiency. As a result, the heavy part in question may be removed from the power generation system. Following the dismantling, it is possible to recondition the heavy part by following the method described herein.

Following the reconditioning of the heavy workpiece, it may be reinstalled, and electricity production may start again. As mentioned, the reconditioning step is accelerated using the present reconditioning method, as it is no longer necessary to waste time in transporting the heavy workpiece to an external site for reconditioning.

In some examples, the power generation process is that of the production of hydroelectricity. This production may be carried out in a hydroelectric power plant where the heavy parts to be reconditioned are, for example, those of a hydraulic turbine used for the production of hydroelectricity. Examples of parts to be reconditioned are a Francis type moving wheel, a Kaplan type moving wheel, a wicket gate, a draft tube, an alternator, runner blades, a shaft or a gate opening ring. It is appreciated that this list is not limiting, any other part used in a hydroelectric plant may be subject to reconditioning in accordance with the present teachings.

Figure 2:
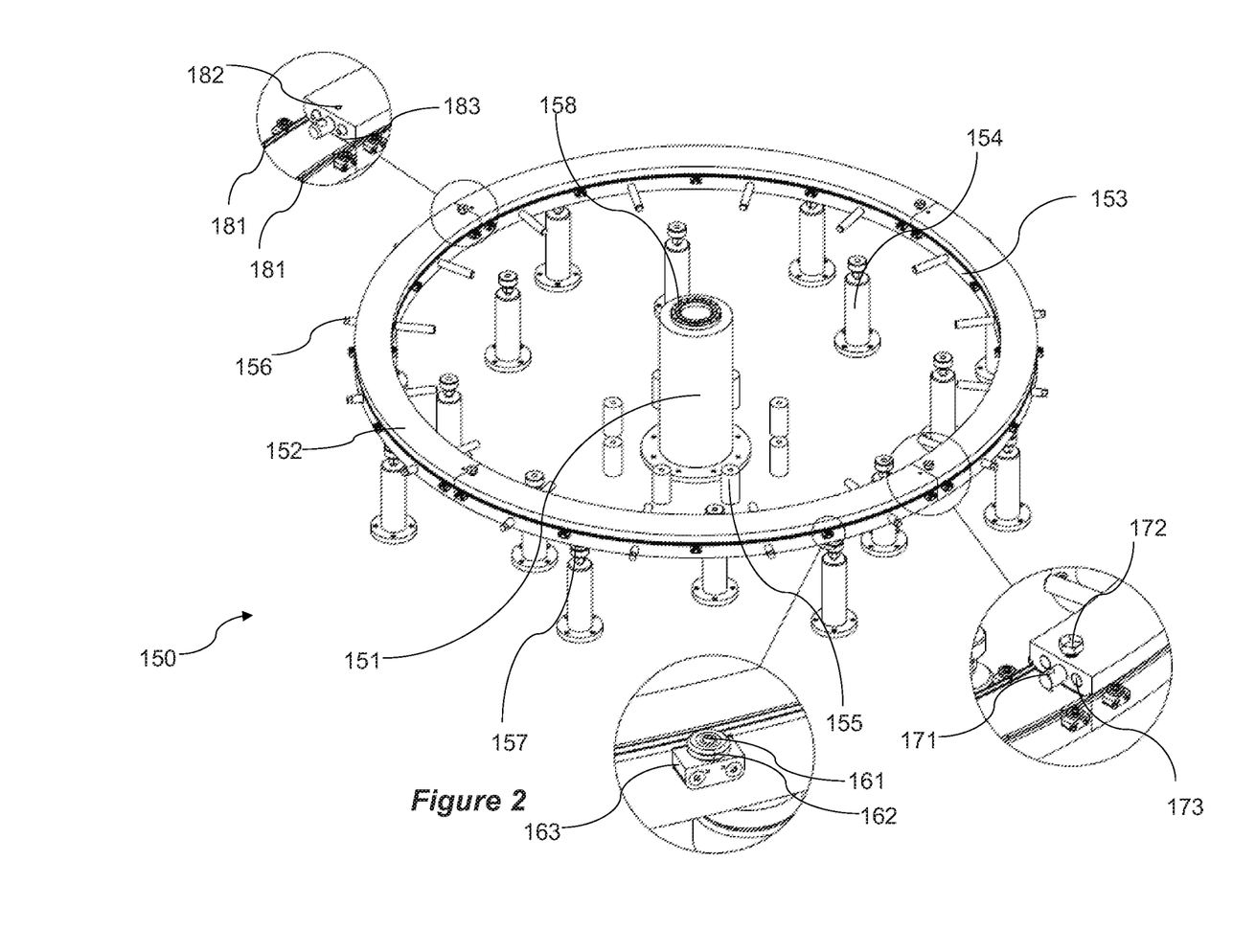
FIG. 2 is a top view illustrating an exemplary jig and exemplary stilts, with magnified views of different components making up the jig.

The Reconditioning Apparatus 100:

Referring to FIGS. 1A, 1B, and 2, the reconditioning apparatus 100 will now be described in greater detail.

The Jig 150:

The jig 150 is a support that surrounds at least a portion of the heavy workpiece 140 and serves as a support for the gantry 110. The jig 150 may be annular in shape, thus encircling the heavy workpiece 140. However, in other examples, the jig 150 may also have another shape, such as that of a cylinder, depending on the shape of the parts to be reconditioned. In some examples, the jig 150 is formed of several segments to be transportable and easily dismantled. The jig 150 may easily be stowed when not in use, which is useful if the reconditioning apparatus 100 is kept on site, and taken out when reconditioning of a part is required.

In some examples, the jig 150 may have a turntable consisting of a fixed portion 153 and a movable portion 152. Each portion (fixed 153 and movable 152) may be formed from a plurality of segments. As shown in FIG. 2, in one example, the fixed portion 153 and the movable portion 152 are respectively formed by four segments (e.g. arc-shaped) of substantially equal dimensions. However, the number of segments of the fixed portion 153 and the movable portion 152 may be other than four (e.g. 2, 3, 6, etc.). The segmentation of the jig 150 parts facilitates the transport and storage of the jig 150. However, in other examples, the jig 150 may be composed of a single piece and not segments, or that at least one of the fixed 153 and rotating portions 152 is composed of one piece.

The segments of the fixed part 153 and movable part 152 may be respectively attached to each other using fixing means 182, 183, 171, 172 and 173. Examples of the fixing means is a pin 182, coupling guides 173 and 183, bolt* 172 and a guide pin 171, etc. The guide pin 171 and the coupling guides 173 and 183 may also facilitate the alignment of the segments of the fixed portion 153 and the segments of the movable portion 152. The fastening means preferably allow the precise alignment of the segments but also offer a reliable fastening that will endure the reconditioning of the workpiece, minimizing movements during the reconditioning process.

*Translator note: The French version mentioned the word <<bouillon>> ("broth" in English), which is a clear typographical error for the word <<boulon>> ("bolt" in English); the word "bolt" was therefore selected by the translator.

The jig may also be provided with core rods 156, protrusions which are fixed in the jig 150 (e.g. the fixed part 153 of the jig) and which may be adjusted to come into contact with the heavy workpiece 110 when the heavy workpiece is placed in the center of the jig 150. The central rods 156 provide additional stability to the heavy workpiece 140, thereby connecting the jig 150 and the heavy workpiece 140.

The jig 150 may also have a moving mechanism for moving at least a portion thereof relative to the floor to, for example, allow mobilization of the gantry 110 joined to the jig 150 to manipulate the position of the machining tool 116. When the jig 150 has a turntable, the movement mechanism may change the position of the movable portion 152 on which the gantry 110 is mounted.

Thus, in some examples, the jig 150, or at least a portion thereof, as the upper ring of the turntable, is configured to move relative to the floor. However, since the reconditioning must be done with precision, the movement of the gantry 110 must also be done accurately, engaged by the displacement of the jig 150, when at least one end of the gantry is joined to the jig 150. Thus, the turntable or the jig 150 on which is joined at least one end of the gantry 110 may be moved using a system of gears mounted on a very high efficiency precision bearing. For example, such a system may be a roller pinion system mounted on precision bearing which engage with a rack attached to said jig, such as the "Roller Pinion System" of Nexen™. It is appreciated that other mechanisms for moving the precision turntable may be used. As shown in FIG. 2, there may be two racks 181, placed on each edge of the surface of the moving part 152 which faces the fixed part 153. The rack 181 may also be an arc, in order to match the shape of the jig 150 if it has a ring shape. In other examples, when the jig has a form other than annular (ex: straight form), the rack may also be straight. The follower rollers 162 may be mounted either on one or both sides of the jig 150 to engage with one or two racks 181. The follower roller 162 may be mounted on bearings and may serve as a connection between the fixed part 153 to the moving part 152. There may be several follower rollers 162. In the examples where the rack 181 is of annular shape, the follower roller 162 may be placed on a surface of the jig 150 perpendicular to the surface of the jig 150 on which the rack 181 is mounted. The follower roller 162 may also be mounted on a bracket 163, the bracket 163 being, for example, fixed to the fixed part 153 of the jig 150 with the aid of an anchoring means (e.g. a screw, a bolt). The follower roller 162 may also have a support element 161.

In other examples, the jig may be fixed relative to the ground. In these examples, the movement of the robotic arm and the gantry may be done independently of the jig, the jig having no mechanism to move.

The Stilts 154:

The reconditioning apparatus 100 may have stilts 154 for receiving the jig 150 and/or other stilts 154 for receiving the heavy workpiece 140. In some examples, the stilts 154 preferably have a strength and durability to be able to withstand the weight of a heavy workpiece 140 that weighs hundreds of tons.

The stilts 154 are parts intended to serve as an abutment and/or support. The stilts are therefore supports (for example, either to receive the turntable of the jig 150 and/or the heavy workpiece 140) which offer an height adjustment in order to be able to level, for example, the jig 154 (ex: its turntable) with respect to the heavy workpiece 140.

Figure 4:
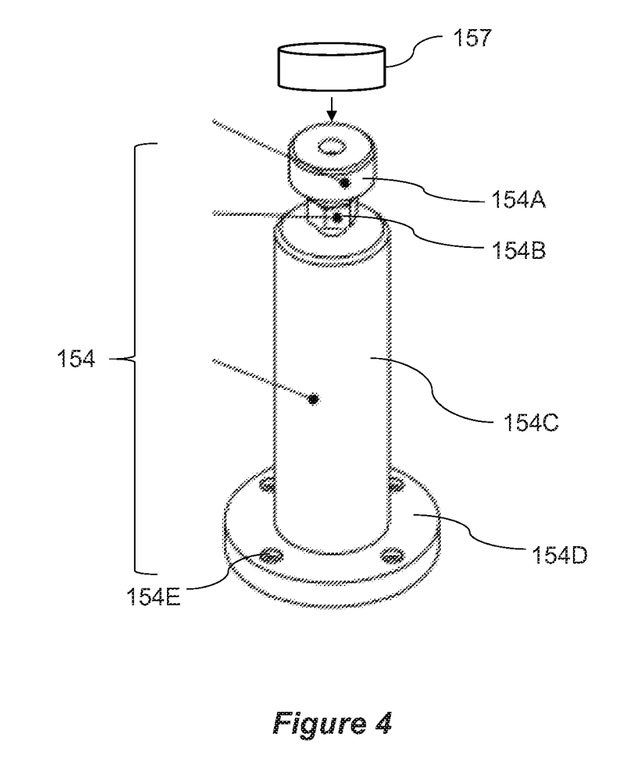
FIG. 4 is a front view of an exemplary stilt with exemplary wedge.

Referring to FIG. 4, an example of a stilt is the stilt 154 which has a body 154C, a height adjustment mechanism such as an adjustable stand 154B, a head 154A and a base 154D.

The adjustable stand 154B, as it is known in the art, is an adjustable portion which allows to adjust the height of the stilt 154 to accommodate either the heavy workpiece 140 or the jig 150. The adjustable stand 154B may have a counter nut and a threaded rod, connected to the counter nut, to adjust the height of the stilt 154. The body 154C may have a mechanical tube adapted to receive at least a portion of the threaded rod of the adjustable stand 154B in function of the adjustments to the height of the stilts 154.

The head 154A of the stilt 154 serves as a surface on which rest the heavy workpiece 140 or the jig 150. The head 154A may also be adapted to receive a wedge 157, the wedge 157 between the head 154A of the stilt 154 and the heavy workpiece 140 or the jig 150, minimizing wear caused either by the friction between the stilt 154 and the heavy workpiece 140.

In some examples, the base 154D may also have orifices for receiving anchoring means for anchoring the stilt 154 to a floor. The anchoring means may be, for example, bolts*, screws**, rivets. The anchoring means provide additional stability to the reconditioning apparatus 100. This prevents the unwanted movement of the stilts 154 during reconditioning or after the installation and alignment of the reconditioning apparatus.

In some examples, the body of the stilt 154 may be made of steel.

Figure 5:
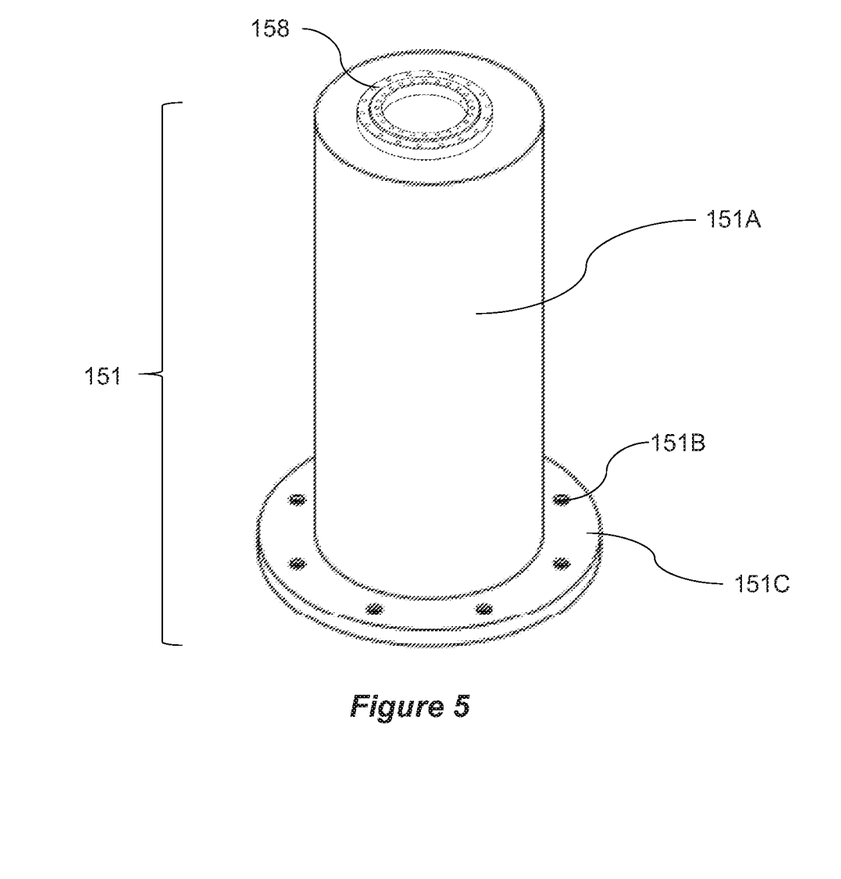
FIG. 5 is a front view of an exemplary central stilt.

Central Stilt 151:

Reference is now made to FIG. 5, illustrating an exemplary central stilt 151. The central stilt 151 is adapted to be placed in center of the jig 150. The central stilt 151 is adapted to receive one end of the gantry 110.

A turntable 158 may be mounted to an upper surface of the central stilt 151. The turntable 158 is adapted to receive one end of the gantry 110, allowing the gantry 110 to follow the angle of rotation of the end of the gantry mounted to the jig 150 (in examples where the gantry 110 is mounted to the jig 150). The turntable 158 may be composed of two rings with a bearing. In some examples, the rotating mechanism of the turntable 158 is precision and gap free.

The central stilt 151 also has a body 151A. The body 151A of the central stilt 151 may be made of steel.

The center stilt 151 may also have a base 151C to give support to the central stilt 151 on the floor and for stabilizing the central stilt 151 on the floor. The base 151C may be in the form of a ring or disk. The base 151C may also have another shape, for example that of a parallelogram (e.g. square, rectangle).

The base 151C may also have anchor holes 151C in order to anchor the central stilt 151 to the floor using anchoring means. Means of anchoring through the anchor holes 151C and entering the floor may be, for example, bolts*, rivets, screws**. The anchoring holes 151C and the anchoring means provide additional stability to the central stilt 151 and to the reconditioning apparatus. This additional stability of the central stilt 151 is particularly desirable in such cases where it receives the gantry 110, in order to minimize sudden and undesirable movements during reconditioning, these movements potentially being sources of error.

In some examples, the central stilt may also have an adjustment mechanism (not shown). This adjustment mechanism may make it possible to modify the height of the central stilt. As the upper surface of the central stilt, receives, in some cases, an end of the gantry, the adjustment of the height of the central stilt may be desirable to accommodate, for example, gantries, robotic arms or reconditioning tools of varying sizes. Furthermore, the adjustment of the central stilt may also be desirable to accommodate heavy parts of different sizes, or the height of the jig 150.

The central stilt 150 may also be surrounded by sub-stilts 155. The sub-stilts may be adapted to receive a portion of the heavy workpiece 140 and provide additional support thereto, and may increase the stability of the heavy workpiece 140. The positioning of the sub-stilts 155 with regards to the central stilt 151 may be obtained, for example, from the readings given by the laser alignment tool.

The Gantry 110:

The reconditioning apparatus has a frame for receiving a robotic arm. In some examples, this frame may include a gantry.

Figure 3:
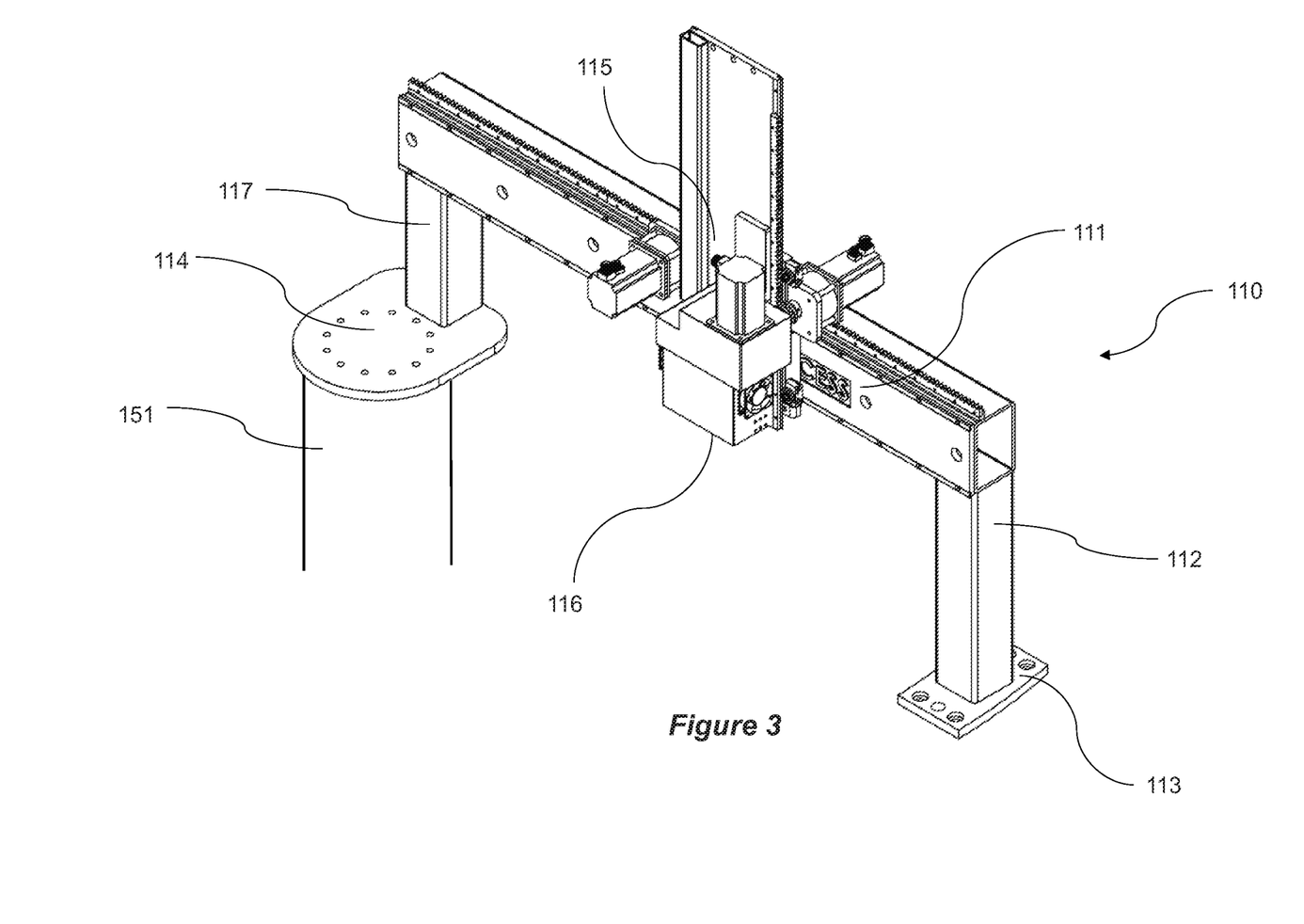
FIG. 3 is a top view of an exemplary gantry on which is mounted an exemplary precision robotic arm carrying an exemplary reconditioning apparatus.

Reference is now made to FIG. 3 illustrating a gantry 110 on which is mounted a precision robotic arm 115 carrying a reconditioning tool 116. In some examples, the gantry 110 is supported at one of its ends (e.g. 117) to a central stilt 151, and at its other end (e.g. end 112) to a surface 113 attached to the jig 150 (or, e.g., its turntable components 152 and 153).

The gantry 110 may be attached to an attachment surface 114 connected to the central stilt 151.

In other examples, the frame may be attached at both ends to the jig, for example to its turntable.

The gantry may also have a bridge 111 connecting its two ends. The robotic arm 115 may be mounted to the bridge 111. The robotic arm 115 may slide along the bridge 111 to assist in moving the reconditioning tool 116 to portions of the heavy workpiece 114, using, for example, a sliding mechanism. The robotic arm 115 is one such as is known in the art.

In the examples where the jig 150 has a moving mechanism (e.g. motorised) with respect to the floor, the gantry 110 is attached to jig 150 (and the central stilt 151) to allow movement of the gantry 110. If the jig 150 has an annular shape, the displacement of the gantry 110 may be that of a rotation around the central stilt 151, the gantry following the radius of the circle defining the jig 150. In the examples where the gantry 110 is joined at both ends to the jig 150, the displacement of the gantry 110 may also be a rotation, the two ends of the gantry 110 moving in the annular shape of the jig 150.

The reconditioning tool 116 is attached to the robotic arm 115. The reconditioning tool 116 may be, for example, a machining tool adapted to remove material from the heavy workpiece as is known in art. The reconditioning tool 116 may also be a welding tool for adding metal to the heavy workpiece as is known in the art. It is appreciated that the reconditioning tool 116 may be any other apparatus as is known in the art for reconditioning the heavy workpiece.

The movement of the gantry 110, the robotic arm 115 and the gantry 110 may be performed digitally via a computer system. The computer system may send commands to control the position of the elements of the reconditioning apparatus 100 and perform the necessary reconditioning. For example, when the jig 150 has a turntable, it is possible to control the turntable with the computer system (e.g. the computer system and/or the rolling system constituting a displacement system), the controls commanding a precise displacement of the moving part 153 of the turntable. The robotic arm 115 and the reconditioning tool 116 are also controllable electronically, in order to be able to recondition the workpiece according to certain parameters provided, for example, by the computer system.

Figure 7:
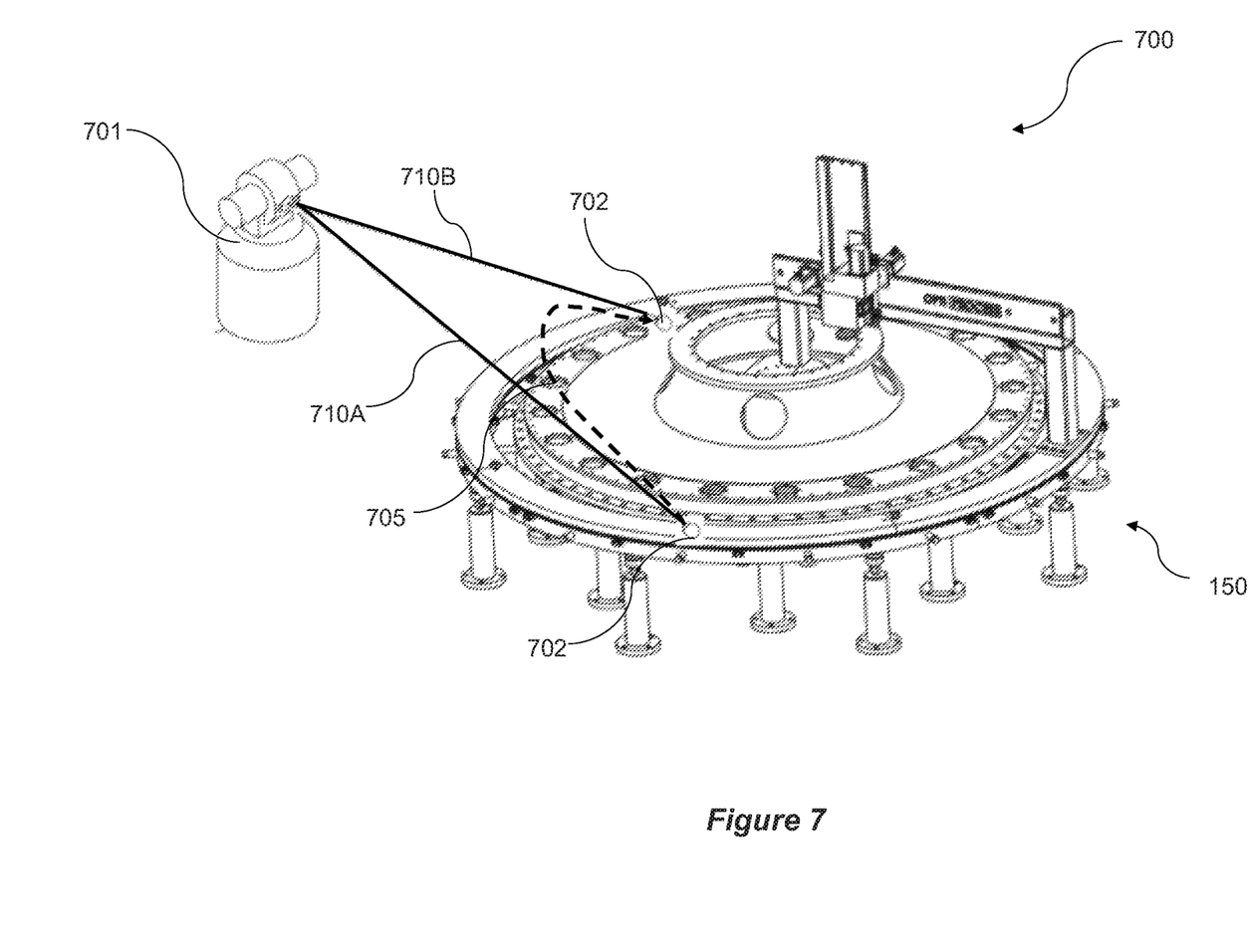
FIG. 7 is an isometric view of an exemplary jig and exemplary stilts and an alignment system including a precision laser alignment tool.

The Alignment System 700:

Reference is now made to FIG. 7 illustrating an alignment system 700 to perform the alignment of the reconditioning apparatus 100 in, for example, a reconditioning method of a heavy workpiece as described herein. The alignment of the reconditioning apparatus 100 and the heavy workpiece 140 may be performed using a laser alignment tool 701. The laser alignment tool 701 may be a tracking laser, and a probe 702 communicating with the tracking laser, as is known in the art. For example, the tracking laser with the probe may be the Leica Absolute Tracker AT402™.

The laser alignment tool 701 may share readings of the dimensions of the reconditioning apparatus 100, such as parts of its jig 150, with the user. Based on these readings, the user may adjust the positioning and height of the components of the reconditioning apparatus 100, for example, by adjusting the height of some stilts 154, or by centering the jig 150 with regards to the heavy workpiece 140.

Thus, when the laser alignment tool 701 includes a tracking laser and a probe 702, it is possible to place the probe 702 at different locations on a surface of the reconditioning apparatus 100 (e.g. the jig 150) and obtain readings. Once a reading is obtained, it is possible to move the probe 702 to another location (e.g. displacement 705), in order to obtain new measurements. In a first position, the probe and the tracking laser may make a first reading 710A, and, following a displacement 705 of the probe 702, they may make a second reading 710B at the second location. The repositioning of the probe 702, the communication with the tracking laser, and obtaining readings, may be done as many times as necessary to obtain sufficient information on the dimensions and position of the various components of the reconditioning apparatus 100 and the heavy workpiece 140 in order to perform their alignment, necessary to achieve the desired level of precision to recondition the heavy workpiece. For example, the alignment of the reconditioning apparatus and of the heavy workpiece may be done as the readings are shared by the laser alignment tool 701, or after obtaining a series of readings.

This description has been presented for illustrative purposes of the invention. This description of the invention is not supposed to be exhaustive, nor limiting for the possible variants thereof. Several modifications and variations will be obvious or apparent for a person who is skilled in the art.

The invention claimed is:

1. A precision reconditioning apparatus of a heavy workpiece mounted on a floor, said apparatus comprising:
   a jig comprising:
      a central stilt; and
      an annular turntable centered around said central stilt;
   a gantry with two ends configured to be supported at one of said two ends on said central stilt and the other of said two ends on said turntable; and
   a robotic arm mountable on said gantry, said robotic arm configured to receive a machining apparatus for readjusting said heavy workpiece.

2. The apparatus according to claim 1, wherein said robotic arm comprises at least one machining apparatus.

3. The apparatus according to claim 2, wherein said at least one machining apparatus comprises a welding tool adapted to add metal to said workpiece.

4. The apparatus according to claim 1, wherein said turntable comprises a fixed portion and a movable portion, said fixed portion being connected to said movable portion by a precision rolling system.

5. The apparatus according to claim 4, wherein said precision rolling system is a precision system of bearing-supported roller pinions which engages with a rack joined to said jig.

6. The apparatus of claim 1, wherein said apparatus comprises at least three height-adjustable stilts for receiving said turntable to enable said turntable to be leveled.

7. The apparatus of claim 1, wherein said apparatus comprises at least three height-adjustable stilts for receiving said heavy workpiece and for enabling said heavy workpiece to be leveled.

8. The apparatus according to claim 1, wherein said turntable is composed of an assembly of arc-shaped segments.

* * * * *